United States Patent Office 3,808,332
Patented Apr. 30, 1974

3,808,332
PHARMACEUTICAL COMPOSITIONS CONTAINING THE REACTION PRODUCT OF A TERTIARY PHOSPHINE WITH THYROXINE
Harold C. Reynolds, Kankakee, and Donald B. Olsen, Bonfield, Ill., assignors to Armour Pharmaceutical Company, Chicago, Ill.
No Drawing. Continuation-in-part of application Ser. No. 794,408, Jan. 27, 1969. This application Sept. 21, 1970, Ser. No. 74,125
The portion of the term of the patent subsequent to May 4, 1988, has been disclaimed
Int. Cl. A61k 27/00
U.S. Cl. 424—198
3 Claims

ABSTRACT OF THE DISCLOSURE

A pharmaceutical composition comprising of a pharmaceutically acceptable carrier and the reaction product formed by reacting less than a stoichiometric amount of a tertiary phosphine with thyroxine (free acid) in a dipolar aprotic solvent. The composition contains thyroxine (free acid) and 3,5,3'-L-Triiodothyronine in a preselected ratio to each other and is useful for the treatment and control of body disorders associated with an impairment of the thyroid hormone function.

---

This application is in part a continuation from our copending United States patent application Ser. No. 794,408 filed Jan. 27, 1969, now U.S. Pat. No. 3,577,535 which is a divisional from our United States patent application Ser. No. 561,357, filed June 29, 1966, now U.S. Pat. No. 3,477,954.

The present invention relates generally to pharmaceutical compositions containing a pharmacologically active form of triiodothyronine, namely, 3,5,3'-L-triiodothyronine, which are useful as calorigenic agents in the treatment and control of body disorders associated with an impairment of the thyroid hormone function. More particularly, the invention relates to compositions containing 3,5,3'-L-triiodothyronine and thyroxine which are useful therapeutic agents for treating thyroid-deficient animals, especially man.

It is well-known that the great utility of desiccated thyroid, which has been marketed at least since 1913, is brought about by the presence therein of iodinated thyronines, especially 3,5,3'-L-triiodothyronine. Furthermore, dessiccated thyroid has for years been a medical standby for the treatment of human body disorders associated with the impairment of thyroid hormone function and until very recently the animal glands from which it is prepared have been in economical and plentiful supply. Now, however, the demand for natural thyroid is inordinately disproportionate to the supply of fresh glands available and it has become imperative that the pharmaceutical industry discover how to obtain the effect of desiccated thyroid by the administration of synthetic products.

Pitt-Rivers and Gross were among the first to attempt to synthesize thyroid substitutes and they have published several articles on their work. One of their efforts is described in U.S. Patent No. 2,823,164, Feb. 11, 1958, which also provides background for the problem. The method they disclose, viz, the iodination of 3,5-diiodothyronine (herein called "$T_2$") to product 3,5,3'-L-triiodothyronine (herein called "$T_3$"), suffers from the disadvantage that unless all of the $T_2$ is iodinated, a residuum of $T_2$ remains. $T_2$ has little or no therapeutic value in treating the thyroid deficient patient and therefore if permitted to remain with the $T_3$ of Pitt-Rivers and Gross, it exists as foreign matter.

One question in the field of thyroid therapy which is still debated involves the relative effect of the thyroxine (herein called $T_4$) and $T_3$ in desiccated thyroid upon the thyroid deficient patient. There are members of the medical profession who believe that a concentrated $T_3$ administration (free of all $T_4$), such as that advocated by Pitt-Rivers and Gross, is not able to duplicate the effect of administering desiccated thyroid although it is still warranted for use under special circumstances. Other doctors believe that the effect of desiccated thyroid is better obtained by the administration of a synthetic product which contains both $T_3$ and $T_4$ in the approximate proportions to each other exist in a natural thyroid product.

Thus, it is apparent that a need exists for a method of preparing $T_3$ which avoids residual $T_2$ and which, if possible, also permits the production of a synthetic thyroid product which, when desired, can contain both $T_3$ and $T_4$ in preselected ratios, preferably duplicating the measured ratio of these agents in natural thyroid products. A mixture containing about one part $T_3$ to about four parts $T_4$ is believed to simulate the metabolic effects of normal thyroid secretion.

The present invention is based upon our discovery of a new and useful method for preparing 3,5,3'-L-triiodothyronine which not only provides 3,5,3'-L-triiodothyronine of excellent quality by the selective deiodination of thyroxine, but which also can be controlled to provide a preselected amount of unreacted thyroxine ($T_4$) in the final product so as to substantially duplicate the $T_3:T_4$ ratio of desiccated thyroid and thereby produce our product of choice. Further, we have found that such effect can be obtained within $T_4:T_3$ ratios of from about 3.5:1 to about 8:1.

Accordingly, a principal object of the present invention is to provide a method of producing a pharmacologically active iodinated thyronine, namely, 3,5,3'-L-triiodothyronine and which may contain preselected and controlled amounts of thyroxine and which has great clinical utility as a replacement for desiccated thyroid in the prevention or treatment of goiter, both nodular and non-nodular, and which is of particular utility for the treatment of disorders associated with thyroid deficiencies, cretinism, myxedema as well as a variety of clinical conditions associated with subclinical hypothyroidism.

Still another object of the present invention is to provide a method for producing substantially pure 3,5,3'-L-triiodothyronine from a phosphonium iodide complex of thyroxine.

A further object of the present invention is to provide pharmaceutical compositions contained in a pharmaceutically acceptable excipient, synthetic active components in relative proportions to each other so as to substantially simulate the ratios of the corresponding natural components as they occur in normal thyroid secretions or in natural desiccated thyroid; which compositions simulate substantially all of metabolic characteristics of normal thyroid secretion or of natural desiccated thyroid; and which compositions are prepared by a process which achieves, inter alia, the preparation in situ of such properly proportioned components.

These, and still further objects as shall hereinafter appear, are readily fulfilled in a remarkably unexpected fashion by our invention as will be readily discerned from the following detailed description of embodiments which are exemplary thereof.

As used herein, theterms "3, 5, 3'-triiodothyronine" and "$T_3$" are used interchangeably to define that iodinated thyronine compound having the structure

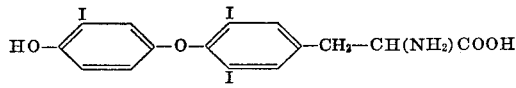

the terms "thyroxine" and "$T_4$" are used interchangeably to define that iodinated thyronine compound having the structure

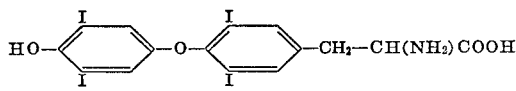

In the practice of the present invention, we find that thyroxine or the sodium salt of thyroxine provide the most commercially practicable starting material for our process. When we start with the sodium salt of thyroxine, we convert the salt to thyroxine such as by reacting the salt with glacial acetic acid in the presence of water to form a slurry. Next, this slurry is filtered and the resulting filter cake is washed with water. This washed cake is then dried under vacuum at 80° C.–100° C., and is thyroxine (free acid).

Generally speaking, our process may be performed in two steps.

In the first step, thyroxine is reacted with a tertiary phosphine selected from the group consisting of trialkyl phosphine, tri(alkalaryl) phosphine and triaryl phosphine to form a phosphonium iodide complex of thyroxine. As will appear, the reaction which takes place in the presence of dimethyl formamide which is representative of dipolar aprotic solvents.

In this step, phosphine can be represented by $(R_1R_2R_3)$ P wherein $R_1$ and $R_2$ and $R_3$ each may be either alkyl or aryl. Preferably, though not necessarily, $R_1$, $R_2$ and $R_3$ will be the same moiety as in tri-n-butylphosphine, tri-m-octylphosphine, tri-phenylphosphine and the like.

In practice, it has been found especially desirable to use an alkyl having one to four carbons, for example, methyl, ethyl, propyl, i-propyl, butyl. Our alkyl reagent of choice, by virtue of its relative low cost and availability is tributyl phosphine.

Tertiary phosphines containing aryls selected from the group comprising phenyl, substituted phenyl and methyl toluene are highly satisfactory. It does not appear to be significant what moiety is used as the substitutent on the phenyl since this linkage remains intact throughout the process although moieties which are stable substituents on phenyl include chloro, bromo, fluoro, nitro, amino, methyl, methoxy, and the like.

Our aryl reagent of choice is triphenyl phosphine.

Step one of our process may be shown by the following notation:

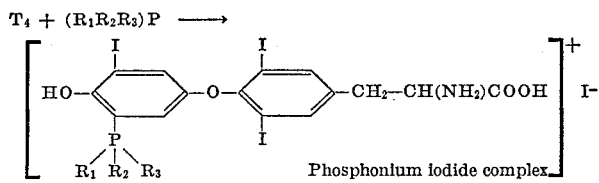

In the next step, the phosphonium iodide complex, so produced is hydrolyzed with water, preferably in the presence of a suitable catalyst such as the hydroxides of alkali or alkaline earth metals, for instance, NaOH, Ca(OH)$_2$, KOH, and the like, to form a reaction product containing 3, 5, 3'-L-triiodothyronine, ionized hydrogen iodide, and a compound selected from the group consisting of trialkyl phosphine oxide, tri(arylalkyl) phosphine, reagent selected for the first step.

This step is shown in the following notation:

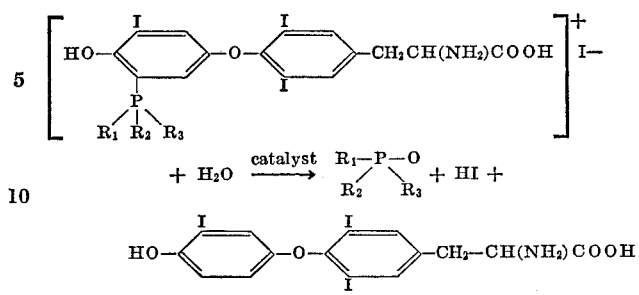

It is apparent that when the reagents utilized in step one are provided with a stoichiometric imbalance, that is, if stoichiometrically we provide more thyroxine than can be complexed by the quantity of phosphine introduced into the reaction, then the reaction product will contain a controllable amount of thyroxine, i.e., the stoichiometric excess, in addition to the complex as illustrated.

Thus, when the reaction product of step one, containing both thyroxine and complex, is hydrolyzed according to step two, the final product of step two will contain both $T_4$ and $T_3$ in whatever proportions are indicated by the amounts of the various ingredients employed.

The reaction product of step two prepared as described, will for purposes of the following description be identified as $T_3/T_4$.

The $T_3/T_4$ is administered in therapeutically effective amounts to animals, including man, and in appropriate ways. The dosages are determined in the same manner as the dose of desiccated thyroid is presently determined by practicing physicians. The preparations will normally be introduced to the host system by an oral route of administration.

In the preferred embodiments of the invention, $T_3/T_4$ is administered in a pharmaceutical composition which includes the $T_3/T_4$ and a pharmaceutical carrier. The carrier is a non-toxic pharmaceutical grade substance and may be either solid or liquid. Suitable solid carriers include lactose, magnesium stearate, starch, sucrose, mannitol, sorbitol, cellulose powder, dicalcium phosphate, talc, stearic acid, gelatin, agar pectin, acacia and the like. Suitable liquid carriers include glycols, polyglycols, peanut oil, olive oil, sesame oil, alcohols, water, and the like. If desired, the carrier may include a time delay material such as glycerol monostearate, or glycerol di-stearate, alone or with a wax.

The composition preferably is provided in unit dosage form for accuracy and convenience in administration and oral administration is both effective and preferred. Dosage units, suitable for oral administration, include dosage units employing solid carriers such as tablets, capsules, lozenges, packets and the like. The amount of solid carrier per dosage unit may vary widely, preferably from about 25 milligrams to 5 grams.

The foregoing dosage forms are prepared by conventional procedures of mixing, granulating, compressing, suspending and/or dissolving, as is suitable to prepare the desired dosage form.

The condition of a host animal including man which has impaired thyroid hormone is readily treated and controlled by administering to the afflicted host $T_3/T_4$ in an amount sufficient to alleviate the symptoms of the condition. The usual symptoms requiring treatment are those known to accompany hypothyroidism, that is, low protein-bound iodine (PBI), myxedema, lethargy and the like.

The compound preferably is administered at the dosage level described above and preferably in a pharmaceutical carrier. The dosage level and frequency of administration are to a certain extent subjective, attention being given to the degree of hypothyroidism, the case history, the reaction of the subject, and the like.

The daily dosage can be administered in one or more parts and the administration preferably is accomplished pancavally, especially, orally. Administration for the provision of systematic control and treatment of hypothyroidism is preferably oral and is most conveniently accomplished by means of a tablet containing $T_3/T_4$.

To further aid in understanding the present invention, and not by way of limitation, attention is directed to the following examples.

EXAMPLE I 1.62 gms. (2.08 m. mols) thyroxine (free acid) was dissolved in 100 ml. hot DMF. The solution was cooled to 25° whereupon a cloud formed. Stirring was continued overnight to a clear solution. 0.196 gm. (0.75 m. mols) triphenyl phosphine was dissolved in 5 ml. DMF and added dropwise to the thyroxine solution. The mixture was heated to 50-55° and held at this temperature for 19 hours. 10 ml. water was added to the solution and the water and DMF were evaporated off under house-vacuum on the steam cone. A blanket of nitrogen gas was maintained over the evaporating solution. 50 ml. xylene was added to the flask and evaporated. The contents of the flask were dissolved in 25 ml. methyl alcohol. 10 ml. 1 N sodium hydroxide solution was added to the flask, and the slurry was cooled to 25°. The slurry was extracted with 2 × 100 ml. ethyl ether. The ether extract was discarded. The aqueous extract was adjusted to a pH of 8.6 with hydrochloric acid. The precipitate which formed was concentrated in a centrifuge. The supernatant was decanted and the cake reconstituted in 25 ml. saturated salt solution. The slurry was concentrated in a centrifuge and the supernatant was decanted. The cake was dried under high vacuum at 25° to 0.55 gm. Thin-layer chromatography of this product indicated a $T_4/T_3$ ratio of 2.3/1. The product contained 0.30 gm. (0.375 m. mols) $T_4$, 0.13 gm. (0.19 m. mols) $T_3$ and 0.12 gm. sodium chloride.

Analysis of this product indicated it contained 23.5% sodium chloride. The product had the following analysis: Calculated $T_4/T_3$–2.3 (percent): C, 18.4; H, 1.09; I, 47.7. Found (percent): C, 18.54; H, 1.28; I, 47.7.

EXAMPLE II

The procedure of Example I was repeated with 1.62 gms. (2.08 m. mols) of thyroxine and 1.6 gms. (0.57 m. mols) triphenyl phosphine. About 0.45 gm. of product was formed having a $T_4:T_3$ ratio of 3.5:1.

EXAMPLE III

The procedure of Example I was repeated with 1.62 gms. (2.08 m. mols) of thyroxine and 0.86 (0.31 m. mol) of triphenyl phosphine. About 0.5 gm. of product was formed having a $T_4:T_3$ ratio of 8:1.

EXAMPLE IV

As is well known, the currently preferred form for marketing 3,5,3'-L-triiodothyronine and thyroxine for human therapeutical use is as their corresponding sodium salts. The conversion of pure $T_3$ and $T_4$ into the sodium salt is readily accomplished and is illustrated by this example.

8.4 gms. (13 m. mols) of $T_3$, prepared according to the method of our copending application Ser. No. 561,357 is dissolved in 200 ml. boiling 2 N sodium carbonate. The clear solution is cooled to room temperature and further to 4° C. in a refrigerator. The solid which forms is collected in a low-speed centrifuge. The supernatant is discarded. The solid is sodium liothyronine (the sodium salt of 3,5,3-L-triiodothyronine) and is stirred with 2 volumes of 3 A denatured ethanol and centrifuged. The supernatant aqueous ethanol is discarded. The solid is then stirred with 2 volumes of dimethoxyethane and collected on a Buchner funnel. The final cake is dried at 100° C. at 29 inches vacuum to a constant weight and yields 6 gms. (8.9 m. mols) sodium liothyronine.

EXAMPLE V

The following are examples of several types of pharmaceutical compositions prepared according to the invention:

Composition A

Tablets suitable for oral administration and having the following composition per tablet are produced by compounding the ingredients in the same relative proportions:

| Ingredients | Amount |
|---|---|
| Sorbitol | 15 meg to 300 meg. |
| Mannitol | 15 mg. |
| Corn Starch | 85 mg. |
| $T_3/T_4$ | 30 mg. |
| Magnesium Stearate | 4 mg. |

The first four ingredients are milled together to a uniform powder lubricated with a portion of magnesium stearate. The mixture is compressed into slugs, and the slugs are reduced to uniformity and granulated. The granules are lubricated with the remainder of the magnesium stearate and compressed into tablets.

Composition B

Tablets suitable for oral administration and having the following composition per tablet are produced by compounding the ingredients in the same relative proportions:

| Ingredients | Amount |
|---|---|
| $T_3/T_4$ | 15 mg. to 300 mg. |
| Microcrystalline Cellulose | 150 mg. |
| Magnesium Stearate | 4 mg. |

The first two ingredients are mixed to uniformity and lubricated with the magnesium stearate. The mixture is compressed into tablets.

Composition C

Filled gelatin capsules suitable for oral administration and containing the following composition in each capsule are produced by compounding the ingredients in the same relative proportions:

| Ingredients | Amount |
|---|---|
| $T_3/T_4$ | 15 mg. to 300 mg. |
| Lactose | 175 mg. |
| Magnesium Stearate | 5 mg. |

The above ingredients are screened through a #40 U.S. mesh screen to a uniform powder, transferred to a mixer, mixed well, and filled into #1 hard gelatin capsules.

Composition D

Filled soft gelatin capsules suitable for oral administration and containing the following composition in each capsule are produced by compounding the ingredients in the same relative proportions:

| Ingredients | Amount |
|---|---|
| $T_3/T_4$ | 15 mg. to 300 mg. |
| Sesame oil | 50 mg. |

The ingredients are mixed to form a slurry, and the slurry is filled into soft gelatin capsules.

Composition E

Filled soft gelatin capsules suitable for oral administration and containing the following composition in each capsule are produced by compounding the ingredients in the same relative proportions:

| Ingredients | Amount |
|---|---|
| $T_3/T_4$ | 15 mg. to 300 mg. |
| Polyethylene Glycol 400 | 240 mg. |

The ingredients are mixed to form a slurry, and the slurry is filled into soft gelatin capsules.

Composition I

Tablets used for oral administration of $T_3/T_4$ as described hereinafter and having the following composition per tablet are produced by compounding the ingredients in the same relative proportions:

| Ingredients: | Amount, mg. |
|---|---|
| Dicalcium phosphate | 180 |
| Corn Starch | 60 |
| Polyvinylpyrrolidone | 5 |
| Magnesium stearate | 4 |

The tetrazole, dicalcium phosphate and a portion of the starch and magnesium stearate are mixed, granulated with an alcoholic solution of the polyvinylpyrrolidone, dried, and sized. The remainder of the starch and the magnesium stearate are added and mixed. This mixture then is compressed into tablets.

Composition J

Tablets used for oral administration of $T_3/T_4$ as described hereinafter and having the following composition per tablet are produced by compounding the ingredients in the same relative proportions:

| Ingredients: | Amount, mg. |
|---|---|
| Lactose | 200 |
| Microcrystalline cellulose | 30 |
| Polyvinylpyrrolidone | 5 |
| Amberlite XE-88 [1] | 5 |
| Magnesium stearate | 4 |

[1] Potassium salt of a carboxylic acid cation exchange resin.

The first three ingredients are mixed, granulated with an alcoholic solution of the polyvinylpyrrolidone, dried and sized. The Amberlite and the magnesium stearate are added. The batch is mixed and compressed into tablets.

In the foregoing examples, we have illustrated our tertiary phosphine with tributyl phosphine and triphenyl phosphine. Our experience with the reaction, however, leads us to believe that any tertiary phosphine will perform in the process. Thus, the only criteria in selecting the tertiary phosphine is its cost and availability. A list of tertiary phosphines which are considered suited for the practice of our process appears at 31-37 under the heading "3. Tertiary Phosphines," in the book by Gennady M. Kosolapoff entitled "Organophosphorus Compounds," copyright 1950, John Wiley Sons, New York (Library of Congress, Call Number: QD142. Pl. K84).

The following example represents an evaluation of various combinations of synthetic $T_4$ and $T_3$ which were formulated to simulate endogenously secreted thyroid hormones at the Harvard Medical School and reported by Drs. Wool and Selenkow in vol. 6, No. 6 of Clinical Pharmacology and Therapeutics.

EXAMPLE V

Twenty-one patients with primary myxedema were treated on an out-patient basis. They were carefully selected to ensure clinical and laboratory athyreosis. Thyroid parameters in the untreated state included a mean PBI level of 1.3 mcg. percent (range 0.4 to 2.8 mcg. percent) and a mean serum cholesterol level of 377 mg. percent (range 191 to 522 mg. percent).

Each patient served as his own control and was treated with one of several combinations containing sodium L-thyroxine, 100-300 mcg. daily (97-291 mcg. L-thyroxine) and L-triiodothyronine, 0 to 50 mcg. daily. The combinations used in this evaluation were prepared by physically admixing various amounts of synthetic sodium L-thyroxine (SYNTHROID brand, Flint Laboratories, Morton Grove, Illinois) and synthetic L-triiodothyronine (CYTOMEL brand, Smith, Kline & French Laboratories, Philadelphia, Pa.).

At the end of each treatment period, the patients were evaluated clinically and serum was obtained for determinations of PBI (normal range 3.5 to 8.0 mcg. percent), cholesterol (normal range 150-250 mcg. percent) and Resin-$T_3$ uptake (normal range 25-35 percent at 25° C.). Basal metabolic rate (BMR) determinations were performed in selected instances. Each combination was continued for a minimum of 6 weeks, but periods of 8 weeks or more were usually observed before changing dosages. The test samples of L-thyroxine and L-triiodothyronine were formulated to be calorigenically equivalent to 180 mg. of a potent porcine preparation of USP thyroid (desiccated thyroid, USP, Armour). In athyreotic patients, the average daily replacement dose of sodium L-thyroxine required to maintain clinical euthyroidism is approximately 300 to 400 mcg. and that of L-triiodothyronine is about 75 to 125 mcg. For simplicity, each combination is designated as the ratio of the microgram content of each synthetic hormone e.g., 150/50 indicates 150 mcg. sodium L-thyroxine and 50 mcg. L-triiodothyronine.

While it is difficult to measure precisely what has been termed "clinical euthyroidism," patients in this study were considered clinically euthyroid on each combination of L-thyroxine and L-triiodothyronine if they evidenced no signs or symptoms of thyroid lack or excess. Cholesterol, Resin-$T_3$, and selected basal metabolic rates were used to substantiate the clinical appraisal of euthyroidism.

Similar regimens were administered to 6 patients with well-documented panhypopituitarism as well as to selected groups of patients with nontoxic goiter and with hyperthyroidism treated with antithyroid-thyroid therapy.

All patients were adjudged clinically and metabolically euthyroid on each combination of L-thyroxine and L-triiodothyronine studied. Mean values for critical parameters of thyroid function at each dosage level are listed in Table I.

TABLE I

| Synthetic combination | PBI mean±s.d.[1] | | Resin-$T_3$, mean±s.d.[1] | | Cholesterol, mean±s.d.[1] | |
|---|---|---|---|---|---|---|
| Myxedema: | | | | | | |
| 150/25 | 4.3±0.4 | (2) | 28.6±2.3 | (2) | 204±17 | (2) |
| 150/50 | 4.1±0.9 | (15) | 30.8±2.3 | (16) | 197±33 | (16) |
| 200/25 | 6.0±1.3 | (14) | 31.7±3.5 | (10) | 186±36 | (8) |
| 200/50 | 6.8±1.7 | (22) | 32.3±2.3 | (20) | 200±34 | (21) |
| 300/25 | 8.9±1.2 | (8) | 36.4±3.6 | (4) | 191±37 | (8) |
| Panhypopituitarism: | | | | | | |
| 150/25 | 3.9±1.0 | (2) | 28.6±3.3 | (2) | 249±35 | (2) |
| 150/50 | 4.5±0.9 | (5) | 27.7±3.7 | (5) | 182±43 | (5) |
| 200/25 | 7.3±0.8 | (3) | 34.6±3.6 | (2) | 177±14 | (3) |
| 200/50 | 5.6±2.0 | (6) | 31.4±2.6 | (5) | 175±37 | (4) |
| Thyroid insufficiency:[2] | | | | | | |
| 150/25 | 4.1±0.7 | (4) | 28.6±2.5 | (4) | 227±26 | (4) |
| 150/50 | 4.2±0.9 | (20) | 30.1±2.6 | (21) | 193±34 | (21) |
| 200/25 | 6.2±1.2 | (17) | 32.2±3.5 | (12) | 184±30 | (10) |
| 200/50 | 6.5±1.8 | (28) | 32.1±2.4 | (25) | 196±35 | (25) |
| 300/25 | 8.9±1.2 | (8) | 36.4±3.6 | (4) | 191±37 | (8) |

[1] Numbers in parenthesis following the standard deviation of the mean represent the number of observations.
[2] Combined data (hypothyroidism and panhypopituitarism).

Based upon this data, the daily oral combination of synthetic hormones which will maintain an athyreotic patient in clinical euthyroidism and at the same time give levels of serum PBI, cholesterol, and Resin-$T_3$ uptake in the useful range of normal contains approximately 175 to 200 mcg. L-thyroxine and 25 to 50 mcg. L-triiodothyronine, that is, in ratios of $T_4:T_3$ of from about 3.5:1 to about 8:1.

We know of no reason to suspect that a product prepared by this invention to have the $T_4:T_3$ ratios reported would react any less efficaciously than the physical mixture created and used at Harvard.

From the foregoing, it becomes apparent that a unique pharmaceutical preparation consisting of a pharmaceutically acceptable carrier and the reaction product formed by reacting less than a stoichiometric amount of a tertiary phosphine with thyroxine (free acid) in a dipolar aprotic solvent has been herein described and illustrated from which it can be discerned that all of the aforestated objectives are fulfilled in a remarkably unexpected fashion. It is, of course, understood that we have presented only illustrative embodiments and such modifications, applications and variations as may readily occur

What is claimed is:

1. A pharmaceutical composition useful for the treatment and control of body disorders associated with an impairment of the thyroid hormone function in animal, especially man, comprising a pharmaceutically acceptable carrier and a therapeutically sufficient amount of the product obtained by reacting a tertiary phosphine with thyroxine (free acid) in a dipolar aprotic solvent to form a phosphonium iodide complex and thereafter hydrolyzing said complex to form said reaction product, said product containing thyroxine (free acid) and 3,5,3'-L-triiodothyronine in a ratio, one to the other, of from about 3.5:1 to about 8:1.

2. The composition of claim 1 wherein said tertiary phosphine has the formula $R_1R_2R_3$ P wherein $R_1$, $R_2$ and $R_3$ are the same or different moieties and are selected from alkyl or aryl.

3. The composition of claim 2 wherein said tertiary phosphine is tri-n-butylphosphine, tri-n-octylphosphine or triphenylphosphine.

References Cited
UNITED STATES PATENTS 3,374,269   3/1968   Langer  260—519

STANLEY J. FRIEDMAN, Primary Examiner

U.S. Cl. X.R.

424—319